US010702855B2

(12) United States Patent
Høj et al.

(10) Patent No.: US 10,702,855 B2
(45) Date of Patent: Jul. 7, 2020

(54) METHOD OF PREPARATION OF A MONILITHIC CATALYST FOR SELECTIVE CATALYTIC REDUCTION OF NITROGEN OXIDES

(71) Applicant: UMICORE AG & CO. KG, Hanau-Wolfgang (DE)

(72) Inventors: Jakob Weiland Høj, Gentofte (DK); Peter Østergaard Vistisen, Lyngby (DK)

(73) Assignee: UMICORE AG & CO. KG, Hanau Wolfgang (DE)

( * ) Notice: Subject to any disclaimer, the term of this patent is extended or adjusted under 35 U.S.C. 154(b) by 0 days.

(21) Appl. No.: 15/777,998

(22) PCT Filed: Nov. 17, 2016

(86) PCT No.: PCT/EP2016/077987
§ 371 (c)(1),
(2) Date: May 22, 2018

(87) PCT Pub. No.: WO2017/089219
PCT Pub. Date: Jun. 1, 2017

(65) Prior Publication Data
US 2018/0333698 A1 Nov. 22, 2018

(30) Foreign Application Priority Data
Nov. 27, 2015 (DK) .................. 2015 00758

(51) Int. Cl.
B01J 23/30 (2006.01)
B01J 37/08 (2006.01)
B01J 21/06 (2006.01)
B01J 23/22 (2006.01)
B01J 35/04 (2006.01)
B01J 37/02 (2006.01)
B01D 53/94 (2006.01)
F01N 3/20 (2006.01)
F01N 3/28 (2006.01)
F01N 3/035 (2006.01)
B05D 1/00 (2006.01)
F01N 3/022 (2006.01)
B01J 37/34 (2006.01)

(52) U.S. Cl.
CPC .............. *B01J 23/30* (2013.01); *B01D 53/94* (2013.01); *B01D 53/9418* (2013.01); *B01J 21/063* (2013.01); *B01J 23/22* (2013.01); *B01J 35/04* (2013.01); *B01J 37/0215* (2013.01); *B01J 37/0236* (2013.01); *B01J 37/08* (2013.01); *B01J 37/346* (2013.01); *B05D 1/00* (2013.01); *F01N 3/022* (2013.01); *F01N 3/035* (2013.01); *F01N 3/2066* (2013.01); *F01N 3/2814* (2013.01); *B01D 2255/20707* (2013.01); *B01D 2255/20723* (2013.01); *B01D 2255/20776* (2013.01); *B01D 2255/9155* (2013.01); *F01N 2330/06* (2013.01); *F01N 2330/18* (2013.01); *F01N 2330/40* (2013.01); *F01N 2610/02* (2013.01); *Y02T 10/24* (2013.01)

(58) Field of Classification Search
CPC . B01J 23/30; B01J 21/063; B01J 23/22; B01J 35/04; B01J 37/0215; B01J 37/0236; B01J 37/08; B01J 37/346; B01D 53/94; B01D 53/9418; F01N 3/022; F01N 3/035; F01N 3/2066; F01N 3/2814; B05D 1/00
See application file for complete search history.

(56) References Cited

U.S. PATENT DOCUMENTS

| 4,280,926 A * | 7/1981 | Abe .................... B01D 53/9418 502/159 |
| 4,916,107 A | 4/1990 | Brand et al. |
| 5,856,263 A * | 1/1999 | Bhasin ................. B01D 53/945 502/333 |
| 2012/0065443 A1* | 3/2012 | Mabande ............. B01J 19/2485 585/430 |
| 2014/0154163 A1 | 6/2014 | Andersen et al. |
| 2015/0037222 A1 | 2/2015 | Hikazudani et al. |
| 2016/0376200 A1* | 12/2016 | Beall ....................... C04B 35/46 502/339 |
| 2018/0318796 A1 | 11/2018 | Høj et al. |

FOREIGN PATENT DOCUMENTS

CN 103 769 080 A 5/2014

OTHER PUBLICATIONS

International Preliminary Report on Patentability for International Application No. PCT/EP2016/077987 dated May 29, 2018 (7 pages).

(Continued)

Primary Examiner — Melvin C. Mayes
Assistant Examiner — Michael Forrest
(74) Attorney, Agent, or Firm — Smith, Gambrell & Russell, LLP

(57) ABSTRACT

Method of preparing monolithic SCR catalyst with a plurality of gas flow channels comprising the steps of (a) providing a monolithic shaped substrate with a plurality of parallel gas flow channels; (b) coating the substrate with a wash coat slurry comprising vanadium oxide precursor compounds and titania and optionally tungsten oxide precursor compounds; and (c) drying the thus coated substrate with a drying rate of 5 mm/min or less along flow direction through the gas flow channels; and (d) activating the dried coated substrate by calcining.

19 Claims, 2 Drawing Sheets

(56) References Cited

OTHER PUBLICATIONS

Liu, Bo, et al. Washcoating of cordierite honeycomb with vanadia-tungsta-titania mixed oxide for selective catalytic reduction of NO with $NH_3$, Catalysis Science & Technology. 2015. vol. 5.pp. 1241-1250.

International Search Report for PCT/EP2016/077987, dated Mar. 6, 2017 in English Language.

Written Opinion of the International Searching Authority for International Application No. PCT/EP2016/077987 dated Mar. 6, 2017.

Qui, K., et al. A novel method of microwave heating mixed liquid-assisted regeneration of $V_2O_5$—$WO_3$—$TiO_2$ commercial SCR catalysts. Environ Geochem Health. 2015. vol. 37, No. 5, pp. 905-914.

\* cited by examiner

Fast drying example

W and V profiles over a wall measured by SEM-EDS.

Slow drying example

W and V profiles over a wall measured by SEM-EDS.

METHOD OF PREPARATION OF A MONILITHIC CATALYST FOR SELECTIVE CATALYTIC REDUCTION OF NITROGEN OXIDES

The invention relates to monolithic structured catalysts for the removal of nitrogen oxides, NOx, from exhaust gases or flue gasses from stationary or automobile sources.

Methods for removing nitrogen oxides from stationary or automobile sources by means of the selective catalytic reduction (SCR) process are well-known in the art.

In the SCR process, the content of NOx in the flue or exhaust gas can be removed or substantially reduced by conversion of NOx to free nitrogen with a reducing agent typically ammonia in the presence of a catalyst by the following reactions:

$$4NO + 4NH_3 + O_2 \rightarrow 4N_2 + 6H_2O$$

$$NO + NO_2 + 2NH_3 \rightarrow 2N_2 + 3H_2O$$

The catalytically active components of vanadium based SCR catalysts compositions consist of vanadium pentoxide and tungsten trioxide supported on titania. For use in gas cleaning the catalyst is washcoated on a monolithic substrate, typically consisting of extruded ceramic monoliths or made of stacked up corrugated sheets of ceramic material or non-woven fibers forming a honeycomb monolith with a plurality of parallel gas flow channels.

Washcoating of a monolithic or honeycomb monolithic substrate is usually performed by slurry pickup in the substrate by pouring the slurry into the channels of the monolithic substrate, or by dipping the substrate at one side into the washcoat slurry and optionally applying vacuum at the opposite side.

After having been coated with the washcoat, the substrate is dried and finally calcined for activation of the catalytic components in the coat.

A problem with washcoating and drying of the washcoated substrate is that it affects concentration gradients of the catalytic components, both across the thickness of the washcoat layer and along the axis of channels in the monolith. As such, it has a potential impact on the quality of the finished catalyst.

Concentration gradients are in particular disadvantageous in vanadium based SCR catalysts. The catalytic activity in the SCR reaction is dependent on the vanadium oxide concentration on the catalytic active surface of the coated substrate. That is, high vanadium oxide concentrations cause high NOx conversion at low temperatures while low conversion at high temperatures. Low vanadium oxide concentrations have the opposite effect.

To gain maximum NOx conversion there must be an even distribution of the desired vanadium concentration for a specific temperature SCR application over the whole surface of the coated substrate.

Both gravity and capillary forces cause the vanadium compound to move over the titania surface at and cause vanadium gradients over the surface.

It is known that vanadium oxide precursors, e.g. ammonium metavanadate move quickly on the surface of titania. The capillary drag is caused by difference in humidity. When no other forces are present vanadium metavanadate tends to distribute itself evenly over the surface of titania as this is the energetic minimum.

We have found that drying conditions providing a relatively low drying rate much reduce formation of concentration gradients in the washcoat.

Additionally, catalyst concentration gradients along micro pores in the washcoat can be reduced when drying the impregnated washcoat partly or completely by means of micro or long wave applications.

Pursuant to the above observations and findings, this invention provides a method of preparing a vanadium based monolithic SCR catalyst with a plurality of gas flow channels comprising the steps of (a) providing a monolithic shaped substrate with a plurality of parallel gas flow channels;

(b) coating the substrate with a washcoat slurry comprising vanadium oxide precursor compound(s) and titania; and (c) drying the thus coated substrate with a drying rate of 5 mm/min or less along flow direction through the gas flow channels; and (d) activating the dried coated substrate by calcining.

Specific features of the catalyst according to the invention are alone or in combination thereof that the drying rate is controlled by controlling flow rate of drying air and temperature;

the drying of the coated substrate is performed by means of micro wave or long wave heating;

the drying of the coated substrate is performed by placing the substrate in a position horizontally relative to gravity;

the washcoat slurry further comprises tungsten oxide precursor compound(s);

the monolithic shaped substrate is composed of a number of corrugated sheets stacked upon each other;

the corrugated shaped substrate is formed by rolling up a corrugated sheet;

the corrugated sheet is provided with a flat sheet prior to rolling up;

the corrugated sheets are made of fiberglass;

the monolithic shaped substrate is obtained by extrusion of ceramic material;

the activated coated substrate comprises vanadium pentoxide and titania;

the activated coated substrate further comprises tungsten trioxide;

the vanadium based monolithic SCR catalyst is in form of a wall flow filter.

the corrugated sheet is provided with a flat sheet prior to rolling up;

the drying air rate is 0 mm/min and the drying is performed at room temperature.

The composition of the vanadium based catalyst washcoat typically used in the method according to the invention comprises typically a precursor compound of vanadium pentoxide, which is the active SCR catalyst. Vanadium pentoxide is preferably promoted by the presence of tungsten trioxide. Thus the washcoat preferably further contains a precursor of tungsten trioxide. The precursor compounds are supported on titania particles.

Vanadium pentoxide and tungsten trioxide commonly used are ammonium metavanadate and ammonium metatungstade, which after activation by calcination in air of the dried washcoated substrate decompose to the catalytically active oxides.

The monolithic substrate is coated with the washcoat in accordance with commonly employed coating methods as already mentioned hereinbefore.

The monolithic substrate can be prepared by stacking up a plurality of corrugated sheets made of ceramic or fibrous material, preferably fiberglass.

Preferably the corrugated sheets are provided with a plane sheet, i.e. a liner prior to be stacked up.

Alternatively, the substrate can be prepared by extrusion of ceramic material, e.g. cordierite or silicon carbide.

In all instances, the substrate can also be in form of the known wall flow filters, like SCR catalysed diesel particulate filters.

As mentioned above, the drying rate of the wet washcoat on the substrate can be controlled by the rate of drying air blown into the flow channels after coating. Preferably, the drying conditions include air flow rate inside monolith of 0-3 m/s and a temperature of less than 70° C.

In fact the wet impregnated substrate can advantageously be dried passively at room temperature.

Drying of the washcoat can also be performed by application of micro or long waves. Thereby, smaller concentration gradients along micro pores in the substrate are obtained minimizing capillary forces. Application of micro or long waves can fully or partly replace use of drying air.

In a preferred embodiment of the invention, the washcoated substrate is placed in the drying step in a position horizontally relative to gravity. Thereby, formation of catalyst gradients is even more reduced, in particular at the bottom part of the flow channels. The bottom part shall be understood as the part facing the part where excess of the washcoating slurry is withdrawn during coating of the substrate.

EXAMPLES

Example 1

Figure 2:
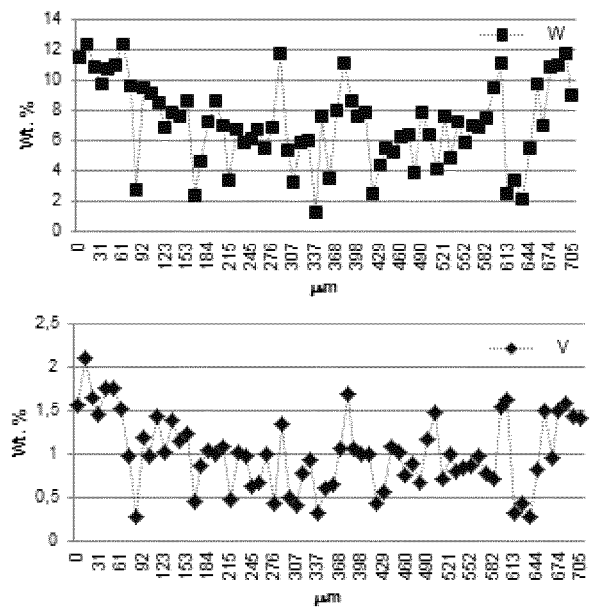
FIG. 2 shows the distribution profile of vanadium and tungsten over wall thickness in the calcined substrate under a fast drying example.
Figure 3:
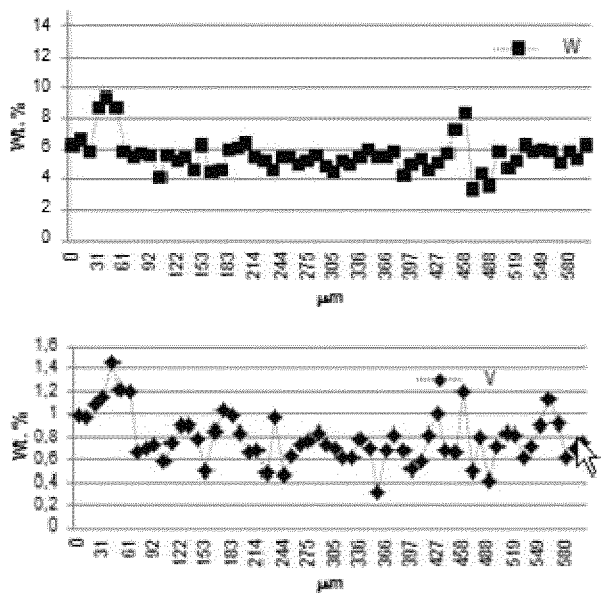
FIG. 3 shows the distribution profile of vanadium and tungsten over wall thickness in the calcined substrate under a slow drying example.

A honeycomb structured substrate was washcoated with a titania slurry containing 1.95 wt % ammonium metavanadate and 9.66 wt % ammonium meta-tungstate to a wash coat layer thickness of 0.3-0.5 mm. The washcoated substrate was dried with warm air at 50° C. and an air flow rate 2 m/sec resulting in a drying rate of 0.8-1.2 mm/min and calcined at 450° C. for 2 h. After drying the washcoated substrate was calcined at 450° C. for 2 hours. The distribution profile of vanadium and tungsten over wall thickness in the calcined substrate is shown in FIG. 3. As seen in FIG. 3, the slow dried substrate has almost no concentration gradients in the distribution of tungsten across the thickness of the washcoat, and the concentration gradient of vanadium is very much reduced compared to the gradients in the fast dried substrate prepared in the following comparison example (see FIG. 2)

Comparison Example

A washcoated honeycomb structured substrate was prepared as in Example 1. The substrate was dried with warm air at 250° C. and an air flow rate of 2 m/sec resulting in a drying rate of 6-8 mm/min and calcined at 450 for 2 h and calcined at 450° C. for 2 hours.

Example 2

Figure 1:
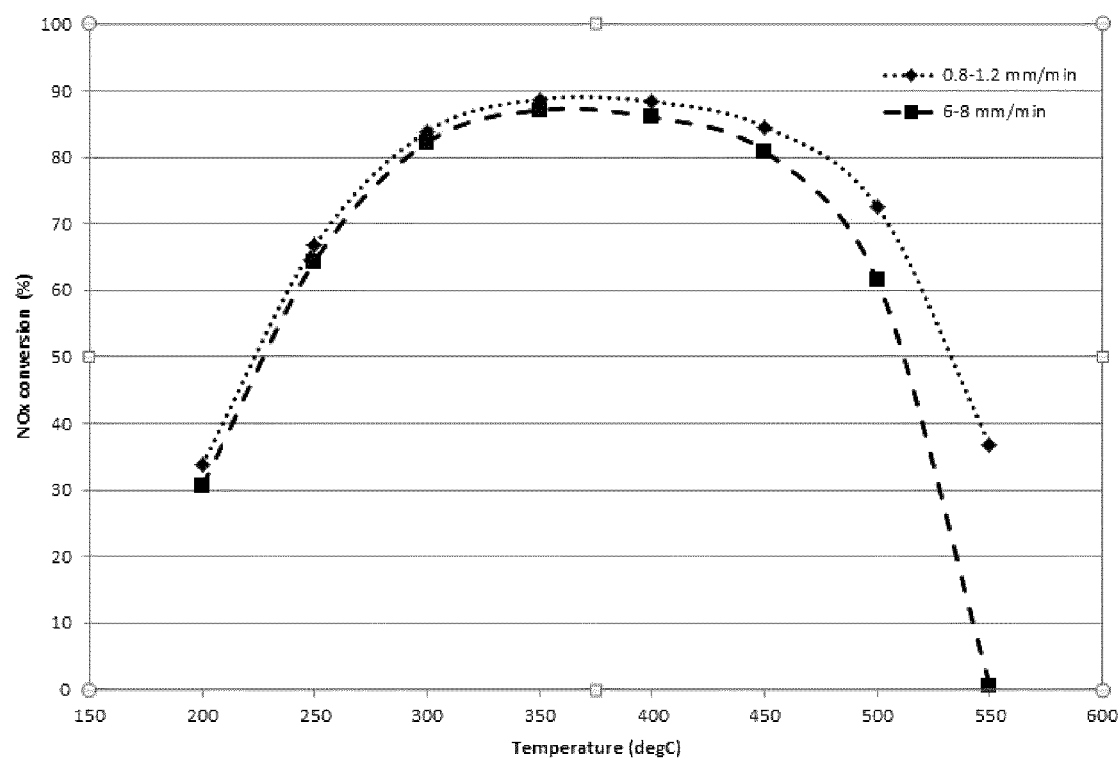
FIG. 1 shows test results of SCR activity of the honeycomb catalysts prepared in Example 1 and in the Comparison Example tested at temperatures between 200 and 550° C. at a NO/NH3 of 1.2.

The SCR activity of the honeycomb catalysts prepared in Example 1 and in the Comparison Example was tested at temperatures between 200 and 550° C. at a NO/NH$_3$ of 1.2. The test results are shown in FIG. 1. As apparent from FIG. 1, the honeycomb catalyst dried at a rate of 0.8-1.2 mm/min has an improved SCR activity at temperatures above 350° C. compared to the catalyst dried at a higher drying rate of 6-8 mm/min.

The invention claimed is:

1. Method of preparing monolithic SCR catalyst with a plurality of gas flow channels comprising the steps of
   (a) providing a monolithic shaped substrate with a plurality of parallel gas flow channels;
   (b) coating the substrate with a wash coat slurry comprising vanadium oxide precursor compounds and titania; and
   (c) drying the thus coated substrate with a drying rate of 5 mm/min or less along flow direction through the gas flow channels; and
   (d) activating the dried coated substrate by calcining.

2. The method of claim 1, wherein the drying rate is controlled by controlling a drying air flow rate to 0-3 m/s and a drying temperature of below 70° C.

3. The method of claim 1, wherein the drying of the coated substrate is performed by means of micro wave or long wave heating.

4. The method of claim 1, wherein the drying of the coated substrate is performed by placing the substrate in a position horizontally relative to gravity.

5. The method of claim 1, wherein the wash coat slurry further comprises tungsten precursor compounds.

6. The method of claim 1, wherein the monolithic shaped substrate is composed of a number of corrugated sheets stacked upon each other.

7. The method of claim 6, wherein each of the corrugated sheets are provided with a flat sheet prior to be stacked.

8. The method of claim 1, wherein the monolithic shaped substrate is a corrugated shaped substrate that is formed by rolling up a single corrugated sheet.

9. The method of claim 8, wherein the single corrugated sheet is provided with a flat sheet prior to rolling up.

10. The method of claim 6, wherein the corrugated sheets are made of fiberglass.

11. The method of claim 1, wherein the monolithic shaped substrate is obtained by extrusion of ceramic material.

12. The method of claim 1, wherein the activated coated substrate comprises vanadium pentoxide and titania.

13. The method of claim 12, wherein the activated coated substrate further comprises tungsten trioxide.

14. The method of claim 1, wherein the monolithic SCR catalyst is in form of a wall flow filter.

15. The method of claim 1, wherein the drying is conducted with a drying air flow rate of 0 m/s and the drying is performed at room temperature.

16. The method of claim 1, wherein the drying rate is 0.8 to 1.2 mm/min.

17. The method of claim 1, wherein the drying temperature is from room temperature to 50° C.

18. The method of claim 17, wherein the drying is conducted with a drying air flow rate of 0 to 2 m/s.

19. The method of claim 1, wherein the drying is conducted with a drying air flow rate of 0 to 2 m/s.

\* \* \* \* \*